Feb. 20, 1934.  P. A. GOLDSWORTHY  1,948,030

BALANCE INDICATOR FOR AIRCRAFT

Filed May 8, 1929

INVENTOR.
Paul Arthur Goldsworthy
BY
J. E. Trabucco
ATTORNEY

Patented Feb. 20, 1934

1,948,030

UNITED STATES PATENT OFFICE 1,948,030

BALANCE INDICATOR FOR AIRCRAFT

Paul Arthur Goldsworthy, Berkeley, Calif.

Application May 8, 1929. Serial No. 361,435

4 Claims. (Cl. 33—215)

This invention relates to balance indicators for aircraft by means of which it can be readily determined at what angle an airplane is positioned with reference to the earth's horizon, as well as the longitudinal or flying angle of the airplane.

An object of my invention is to provide an improved balance indicator for aircraft having means for readily indicating the angle at which an airplane's wings are positioned with reference to the earth's horizon as well as means for indicating the leading or flying angle of the airplane.

Another object of my invention is to provide an improved instrument for aircraft having a mechanism which is automatically operated by the change of position of an airplane to indicate the various flying angles of the airplane.

Another object of my invention is to provide an improved instrument which indicates the position of an airplane while in flight.

Another object of my invention is to provide an indicator for aircraft having co-operating parts which are adapted to show angles of roll dangerous to safe flying and also unsafe angles of climb or glide.

Other objects more or less apparent will present themselves or will be specifically pointed out in the description to follow.

Figure 2:
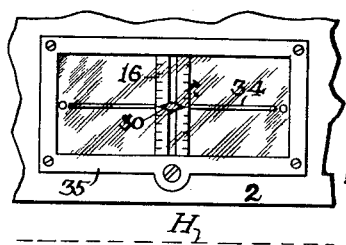
Fig. 2 is a similar view showing the position of the indicator when the airplane assumes an angle of roll with reference to the earth's horizon.

Referring to the drawing, the numeral 1 represents an enclosing casing adapted to be suitably attached to the instrument board 2 of an airplane or other aircraft, having a glass front plate 3 secured thereto. Suitably secured to the bottom of the casing, as by screws, is supporting member 4 having upstanding side brackets 5 secured to its lateral edges. Pivotally attached to the side brackets 5, as by screws, is a frame 6, carrying two rearwardly extending top flanges 7 and 8 and a bottom member 9, the said bottom member being spaced above the bottom of the supporting member 4. The flange 7 is provided with a socket seat 10 within which a ball 11 is supported and is free to move, the said ball being secured to a slotted bar 12 from which is suspended a weight or pendulum 13. Secured to the bottom member 9 of the frame is a circular ring 14 which is located around the pendulum 13 to prevent the same from being moved beyond the area located inside thereof.

The frame 6 is provided with a vertical opening 15 in its central part, and secured to the said frame is a vertically positioned U-shaped slotted dial 16 which is positioned in front of the said vertical opening 15, and is provided with suitable graduation lines or characters thereon.

Secured to the ball 11 and extending forward between two forked projections 17 of the flange 7, is a rod 18 which slidably extends through a sleeve 19. The sleeve 19 is secured as by solder to another sleeve 20 positioned at right angles thereto, and slidably extending through the second mentioned sleeve is a rod 21 which is secured to the circumferential edge of a spool 22. The spool is pivotally attached, as by a screw, to the frame 6, and secured to a circumferential edge of the spool at another point thereon, is a rod 23 which is provided with means at its end for the fastening of the ends of a cord or cable 24. The cord extends over pulleys 25, 26 and 27, the latter pulley being mounted on an adjustable spring pressed bracket 28 which serves as means for producing a suitable tension on the cord at all times. The bracket 28 is resiliently held in a suitable position by a wire spring 29 which is connected to the flange 8 and the said bracket. Suitably secured to the cord 24 is an indication or marker 30 which is normally positioned in the center of the dial 16 and in front thereof. When the airplane on which the balance indicator is mounted assumes a position with the longitudinal axis thereof at an angle to a horizontal plane, the pendulum 13 remains substantially vertical with reference to the earth's surface, but assumes a position either closer to or farther from the front of the frame 6, depending on whether the airplane is nosing up or down. When the airplane thus changes its longitudinal position, the ball 11 is turned relative to the frame 6, thereby causing the rod 18 to actuate the rod 21 through the sleeves 19 and 20 so as to turn the spool 22 on its pivot. As the spool is turned, the rod 23 secured thereto moves the cord 24 over the pulleys, thereby causing the indicator 30 to move upwardly or downwardly in front of the dial 16, depending upon whether the airplane is nosing up or down. The operator of the airplane by glancing at the graduated dial 16 and the indicator 30 can readily determine the position or angle of the airplane with reference to the horizontal.

Extending from the central part of the frame 6 is a projection 31 having a counter balanced hub 32 pivotally mounted thereon. An end of the hub is secured to a rod 33 which slidably extends through the slot in the bar 12. Secured to the front side of the hub at a point thereon adjacent its pivotal axis, is an indicator 34 which extends through the opening 15 of the frame and laterally on each side thereof. When the airplane is tilted, as for instance, so the right hand wing thereof assumes a tilted position above the left hand wing, as shown in Fig. 2, the pendulum 13, although remaining substantially vertical, with respect to the earth's surface, assumes a position closer to the left hand side of the frame 6 than it had when the airplane was flying with its wings in a horizontal plane. The relative change of position of the pendulum with reference to the various parts of the casing and the frame is due to the movement of the frame and casing with the airplane. As the frame and casing move with the airplane, the rod 33, the hub 32 and the indicator 34 are maintained in substantially the same position by the pendulum, while the frame 6, casing 1 and the projection 31 change their positions with reference to the said indicator 34 and the pendulum. The movement of the casing relative to the indicator 34 depends upon the movement of the airplane, and the exact angle at which the wings of the airplane are tilted relative to the earth's horizon, is determined by observing the angle between the indicator 34 and the panels 35 of the casing which represent the earth's horizon. The lower panel 35, or some other suitable mark, is used as a fixed indicator to designate the earth's horizon. The force of gravity causes the pendulum 13 to maintain a substantially vertical position with reference to the earth's surface, but owing to the fact that the casing 1, together with certain other parts of the device, are moved in certain directions by the change of position of the airplane, the indicators 30 and 34 assume different positions with reference to the center of the dial 16 and the panels 35 of the casing, thereby designating the true flying position of the airplane at all times.

In order properly to adjust the instrument for the correction of certain longitudinal discrepancies which sometimes occur, I have provided a suitable adjusting mechanism at the lower part of the casing 1 and frame 6. Projecting downward from the bottom 9 of the frame is a threaded recessed lug 36 having a screw 37 movably located therein. The screw 37 which is accessible through an opening in the lower front panel 35, may be turned either to the right or the left to position the bottom front edge of the frame 6 either closer to or farther from the lower front panel 35 of the casing, thereby causing the various parts of the instrument to be adjusted for longitudinal correction. A spring 38 pressing against the lug 36 tends to maintain the frame 6 in a stationary position relative to the casing. After the screw 37 has been manipulated to suitably position the instrument within its casing 1, the same may be sealed by a wire or other satisfactory means 39.

Figure 1:
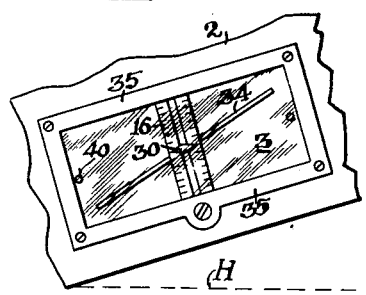
Fig. 1 is a front view of a balance indicator embodying my invention showing the position of the same when the airplane on which it is mounted is flying on an even keel and parallel to the earth's horizon.
Figure 3:
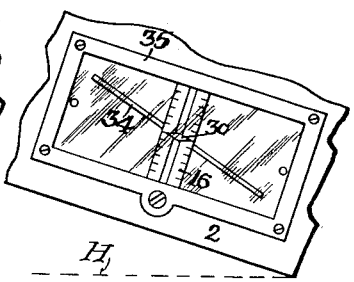
Fig. 3 is a similar view showing the position of the indicator when the airplane assumes an angle of roll in the opposite direction to the angle illustrated by Fig. 2.
Figure 5:
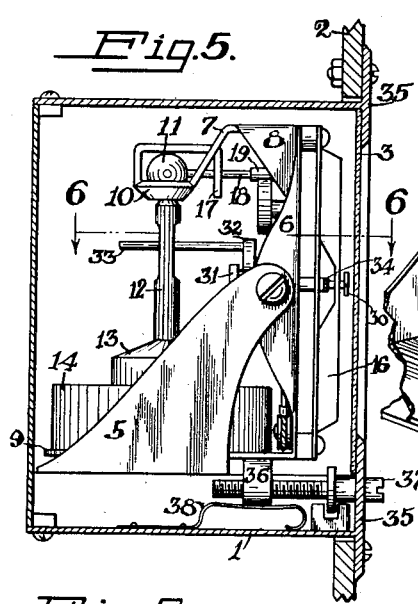
Fig. 5 is a side elevation of the indicator showing a part thereof in cross-section.
Figure 4:
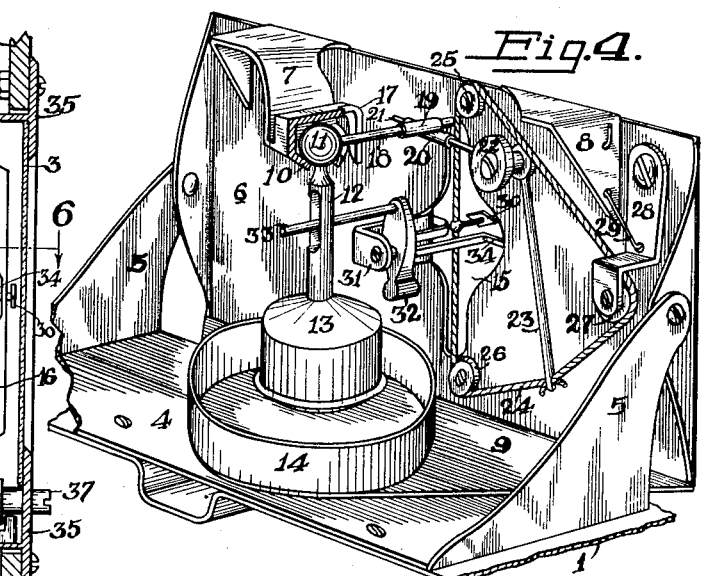
Fig. 4 is a perspective view of the mechanism of the balance indicator as viewed from the rear, showing a part thereof in cross section.

Figs. 1, 2 and 3 show a number of positions my improved balance indicator may assume while the airplane on which it is mounted is proceeding on its course through the air. Fig. 1 shows the dial 16 in a vertical position with the indicator 34 parallel to the top and bottom panels 35 of the casing and the earth's horizon H. The indicator 30 is positioned midway between the top and bottom edges of the dial 16, thereby indicating that the longitudinal axis of the airplane is positioned for a proper flying angle. The indicator 34 being positioned parallel to the panels 35 and the earth's horizon H indicates that the wings of the airplane are not in any manner tilted from the horizontal.

Fig. 2 shows the top and bottom panels, as well as the indicator 34, positioned at an angle with reference to the earth's horizon H. The actual angle at which the airplane's wings are tilted with reference to the earth's horizon is indicated by the angle between the top and bottom panels 35 and the indicator 34.

In Fig. 3 the indicator 34 has assumed a position opposite to that shown in Fig. 2, thereby indicating the angle and direction of tilt of the wings of the airplane. It will be noted that the angle between the lower panel 35 and the earth's horizon is always the same as the angle between the said panel and the indicator 34.

In order to enable the pilot to readily observe the position of the indicators the same may be coated with a luminous material with the frame 6 painted in black. The main dial face may be provided at suitable points thereon with indicating marks 40 which will designate the normal position of the indicator 34.

Figure 7:
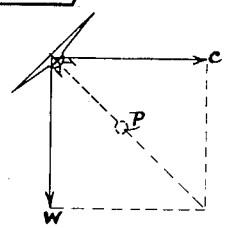
Fig. 7 is a diagrammatic view showing by the arrows the various forces affecting an airplane while making a certain bank or turn, and the position of the pendulum part of my indicator during such movement of the airplane.
Figure 6:
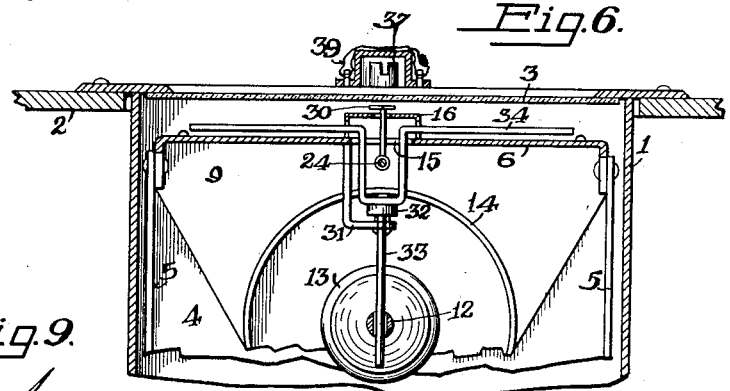
Fig. 6 is a sectional view taken on the line 6—6 of Fig. 5.

Figure 7 illustrates an instance where the airplane on which any improved instrument is mounted is making a curved flight and has sufficient centrifugal force C to overcome the downward component W, which is the weight of the airplane. The pendulum P will take the diagonal of the parallelogram formed by the two component forces and will assume a position perpendicular to the plane of the wings, and hence the indicator 34 will show no angle with respect to the panels 35, thus indicating that the airplane is maintaining a safe angle of bank and that no manipulation of the airplane controls need be made. If, however, the pilot should manipulate the airplane controls so as to cause the airplane to assume some angle of roll greater or less than the said angle of roll, then, with due regard to the centrifugal force present, the indicator 34 will show such a condition by assuming an angle with reference to the panels 35, thus indicating that the controls of the airplane should be so manipulated as to bring about the equilibrium of the airplane.

Figure 8:
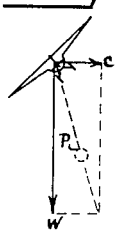
Fig. 8 is a similar view showing the position of the pendulum when one of the forces is not equal to another.

Figure 8 illustrates an instance as in curved flight, where the airplane assumes too great an angle of roll for the centrifugal force present. The pendulum P assumes the position corresponding to the diagonal of the parallelogram formed by the components C and W. In this instance the pendulum is not perpendicular to the plane of the wings and hence the indicator 34 shows an angle with the panels 35, indicating that a correction of the angle of roll should be made.

Figure 9:
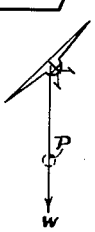
Fig. 9 is a similar view showing another position the pendulum assumes when one of the forces is much greater than the other as in straight line flying rather than in curving.

In Figure 9 an extreme case is illustrated as in straight line flying, where the component force C is zero and the pendulum P takes the position corresponding to the gravity component W. The indicator 34, in this instance, would show an angle with the panels 35 indicating that the airplane was in a dangerous position and should be brought to an even keel by manipulation of its controls.

It is apparent that the balance indicator as herein shown and described may be so constructed as to assume other forms and shapes but yet fulfill the specifications as described. For this reason it is apparent that the panels 35 referred to may be replaced by some other fixed horizontal line of reference, as in the case where the dial of the instrument may be desired in oval or circular form.

Having described my invention, what I claim is:

1. A balance indicator for aircraft comprising in combination, a frame attachable to an aircraft and carrying a pendulum having a slotted arm, a fixed indicator, an indicator pivotally mounted intermediate its ends on the frame providing cantilever arms extending at right angles from and on each side of its pivot, means comprising a rod eccentrically attached to the hub of said pivot and adapted to slidably engage in the slot of the pendulum arm for movement of said rod and indicator by the pendulum, said pendulum being adapted to be moved by lateral roll of the aircraft, and a dial positioned vertically in front of and midway from the extremities of the cantilever arms of said pivoted indicator, a marker, and means including a separate flexible coupling connected to the marker and the pendulum and actuated by change in longitudinal position of the aircraft.

2. A balance indicator for aircraft comprising in combination with a frame enclosed by a casing attachable to an aircraft; a pendulum having a slotted arm suspended in the frame; a fixed indicator on the frame and adapted to represent the horizontal datum line and earth's horizon; a lateral roll indicator comprising a pivot hub having cantilever arms radiating oppositely therefrom and said hub being pivoted to the frame, a rod secured to said pivot hub and slidably engaged in the slot of the pendulum arm for movement of said rod and lateral roll indicator by the pendulum; a vertical dial attached to the frame and positioned midway from the extremities of the lateral roll indicator, a longitudinal climb and guide indicator positioned in front of and adapted to move over said vertical dial, a flexible coupling supported in said frame and connected to the longitudinal climb and glide indicator and the pendulum and adapted to be swung by the pendulum to different positions with relation to the casing and the frame by change in the angle of climb or angle of glide of the aircraft and to move said glide indicator upwardly or downwardly with reference to a central point on said vertical dial to indicate said angles of the aircraft.

3. A balance indicator for aircraft comprising in combination with a frame enclosed by a casing attachable to an aircraft; a pendulum having a slotted arm suspended in the frame and adapted to be moved by unbalanced lateral forces occurring while in flight and by longitudinal flying angle of climb and glide; a main indicating means fixed on the frame; a vertical dial attached to the main indicating means midway from its right and left extremities; said main indicating means having a datum line representing the earth's horizon, horizontally disposed and in fixed relation to said means and said casing; an indicator pivotally attached at its midpoint to the frame to form one cantilever arm extending on one side of said secondary vertical dial and another arm extending on the other side of said secondary dial, a coupling attached to the indicator and the pendulum for causing said indicator arms to assume different positions with reference to said datum line; and a second indicator adapted to move over the said secondary dial upwardly and downwardly, there being a central mark on said secondary dial for cooperating with said second indicator to indicate the angle of climb and the angle of glide, and a flexible coupling connecting the said second indicator and the pendulum.

4. A balance indicator for aircraft comprising in combination with a casing attachable to an aircraft; a frame enclosed by the casing; a main indicating means fixed to the frame; a secondary vertical dial having a central index point associated with the main indicating means and positioned midway from the right and left extremities of the main indicating means; said main indicating means having a datum line representing the plane of the earth's surface, fixed and horizontally disposed with relation to said means and the casing; an indicator arm attached to the frame and extending on each side of said secondary vertical dial as opposite radii and adapted to change its position with relation to said datum line, whereby the airplane's lateral roll may be indicated; an indicator adapted to move upwardly and downwardly with respect to a central point on the vertical dial for showing the angles of climb and glide of the aircraft, a pendulum suspended from the frame and adapted to swing upon change in longitudinal angles of flight and upon unstable lateral angles of roll, and respective means actuated by the movement of the pendulum for transmitting motion to said indicators.

PAUL ARTHUR GOLDSWORTHY.